United States Patent [19]
Brooks

[11] Patent Number: 5,857,535
[45] Date of Patent: Jan. 12, 1999

[54] SEAT FOR SELF-PROPELLED NARROW-TRACK VEHICLE

[75] Inventor: Robert Alden Brooks, Little Bay, Australia

[73] Assignee: Verward Pty. Limited, Little Bay, Australia

[21] Appl. No.: 790,484

[22] Filed: Jan. 29, 1997

[30] Foreign Application Priority Data

Feb. 5, 1996 [AU] Australia .................................. PN7867

[51] Int. Cl.⁶ .............................. H04L 15/24; H04L 15/34
[52] U.S. Cl. ........................... 180/41; 180/282; 280/755; 280/226.1
[58] Field of Search ................................ 280/755, 226.1, 280/760; 180/41, 282, 290, 271

[56] References Cited

U.S. PATENT DOCUMENTS

3,670,834  6/1972  Rogers .................................... 180/41
3,792,748  2/1974  Regier .

*Primary Examiner*—J. Woodrow Eldred
*Attorney, Agent, or Firm*—Smith-Hill and Bedell

[57] ABSTRACT

A low aspect self-propelled vehicle (1) operated by a driver (4) sitting on top of it, has its seat (7) supported from beneath by a flange (12) which is pivoted to tilt about a horizontal axis (15) in the mid-vertical plane of the vehicle. The spacing between the axis (15) and the seat (7) is sufficient to ensure that when the seat is tilted about the axis by operation of a tilt control mechanism (21), the center of seat also displaces a significant extent in the uphill direction of the slope. This reduces the downhill movement of the center-of-gravity (10) of the combination of vehicle plus driver, so that the risk of the vehicle toppling is reduced.

20 Claims, 6 Drawing Sheets

FIG. 6

SEAT FOR SELF-PROPELLED NARROW-TRACK VEHICLE

FIELD OF THE INVENTION

THIS INVENTION relates to a low aspect self-propelled vehicle having its ground wheels separated in the axial direction by typically less than a meter although obviously it may be slightly more, and a weight commensurate with that of its driver. Such a vehicle is steered by the driver sitting above and astride the vehicle and is commonly used for mowing or otherwise tending road verges and similar purposes. Such a vehicle will hereinafter be referred to as being "of the type described" and this expression is to be understood as including diminutive tractors sometimes referred to as mini tractors or micro tractors.

STATE OF THE ART

A vehicle of the type described should not be confused with a conventional agricultural or farm tractor. The weight of a farm tractor is substantially greater than that of the driver and it has a relatively wide track to prevent it from toppling.

The vehicle of the type described is much lighter than a farm tractor and is designed to have a relatively low centre of gravity to enable it to be used to cut grass from sideways sloping road verges and private and public lawns. As the axial spacing between the wheels is small, the vehicle can travel along relatively narrow verges while remaining reasonably parallel to the ground slope beneath. It is thus eminently suited to meeting the needs of municipal councils which are responsible for mowing road verges in their area. Because of the lightness of the vehicle, it can be readily manhandled by a council employee onto a tailboard of a utility vehicle which can then be driven to the site of use. The vehicle can then unloaded from the tailboard and used to cut the road verges.

Two problems are encountered with vehicles of the type described. The first relates to the comfort of the driver. If the vehicle has a fixed seat and is used to cut a gently sloping road verge of extended length, the driver instinctively tries to sit upright on the sideways sloping seat. Such a sitting posture rapidly becomes uncomfortable. This problem has been overcome by the development of the laterally tilting seat which enables the driver to maintain an upright sitting posture despite the vehicle being tilted sideways. Several examples of such tiltable seats are to be found in the recitation of prior art in the introduction of U.S. Pat. No. 5,372,347 (Minnich) and in the description of the drawings therein.

The second and more serious problem encountered with vehicles of the type described is that of toppling. The risk of toppling occurring when the vehicle is driven along a lateral slope of between 10° and 20° —which is not uncommon with a road verge —and is caused by a number of factors. The first factor is that although the vehicle is designed with small, wide pneumatic tires to keep its centre of gravity low, the resultant centre of gravity of the combination of vehicle and driver is substantially higher as the driver sits above the vehicle and his weight is commensurate with that of the vehicle. The higher the centre of gravity of the combination becomes, the greater the risk of toppling because of the vertical line-of-action of the resultant centre of gravity moving sideways beyond the wheels. This can occur as a result of rocking of the vehicle when its tires pass over a small rock or bump in the ground, or the driver momentarily leaning sideways in the downhill direction to observe something on that side of the vehicle. It will be appreciated that when a vehicle topples on top of its driver, it can cause serious injury. It is for this reason that an Australian safety standard No. 3792.1 of 1990 dealing with the stability of vehicles of the type described, requires that there must be no loss of contact of the vehicles tyres with the ground when travelling along a side-slope of 20° and with a driver weighing 95±5 kilograms.

OBJECT OF THE INVENTION

An object of this invention is to improve the safety of a vehicle of the type described.

SUMMARY OF THE INVENTION

A seat for a vehicle of the type described has, in accordance with the present invention, first means for sensing tilting movement of the seat from the horizontal, and second means responsive to the first means to restore the seat to the horizontal position while simultaneously displacing its centre horizontally in the uphill direction.

ADVANTAGE OF THE INVENTION

The advantage of the invention is that, if the vehicle tilts sideways, the driver's seat remains level and his centre of gravity is shifted horizontally in the uphill direction of the slope so that the downhill displacement of the line-of-action of the resultant centre of gravity of the combination of vehicle and driver is reduced. There is thus less risk of the line-of-action reaching the position at which toppling will occur and the vehicle is correspondingly safer to use.

PREFERRED FEATURES OF THE INVENTION

Preferably the simultaneous tilting and lateral displacement of the seat is achieved by supporting it on a member which is pivoted to turn about a horizontal axis spaced a significant distance beneath the seat and lying in its medial plane. The significant distance may be anything between about six centimeters and about fifteen centimeters, this distance being selected to suit the operating parameters of the vehicle to which it is to be fitted. The spacing of the seat above the axis ensures that a required lateral movement of the seat occurs when it is tilted with respect to the vehicle.

The first means are conveniently provided by either pendulum-operated switches or mercury-operated switches mounted on the underside of the seat. Sideways tilting of the seat from the horizontal plane may be detected by one or other of two switches, respectively, and used to control operation of a processor circuit located beneath the seat and controlling a mechanism, such as rack-and-pinion mechanism, forming part of the second means and which produces an appropriate tilt and lateral shift of the seat.

INTRODUCTION TO THE DRAWINGS

The invention will now be described in more detail, by way of example, with reference to the accompanying largely diagrammatic drawings, in which.

In the drawings

DESCRIPTION OF PRIOR ART EMBODIMENT

Figure 1:
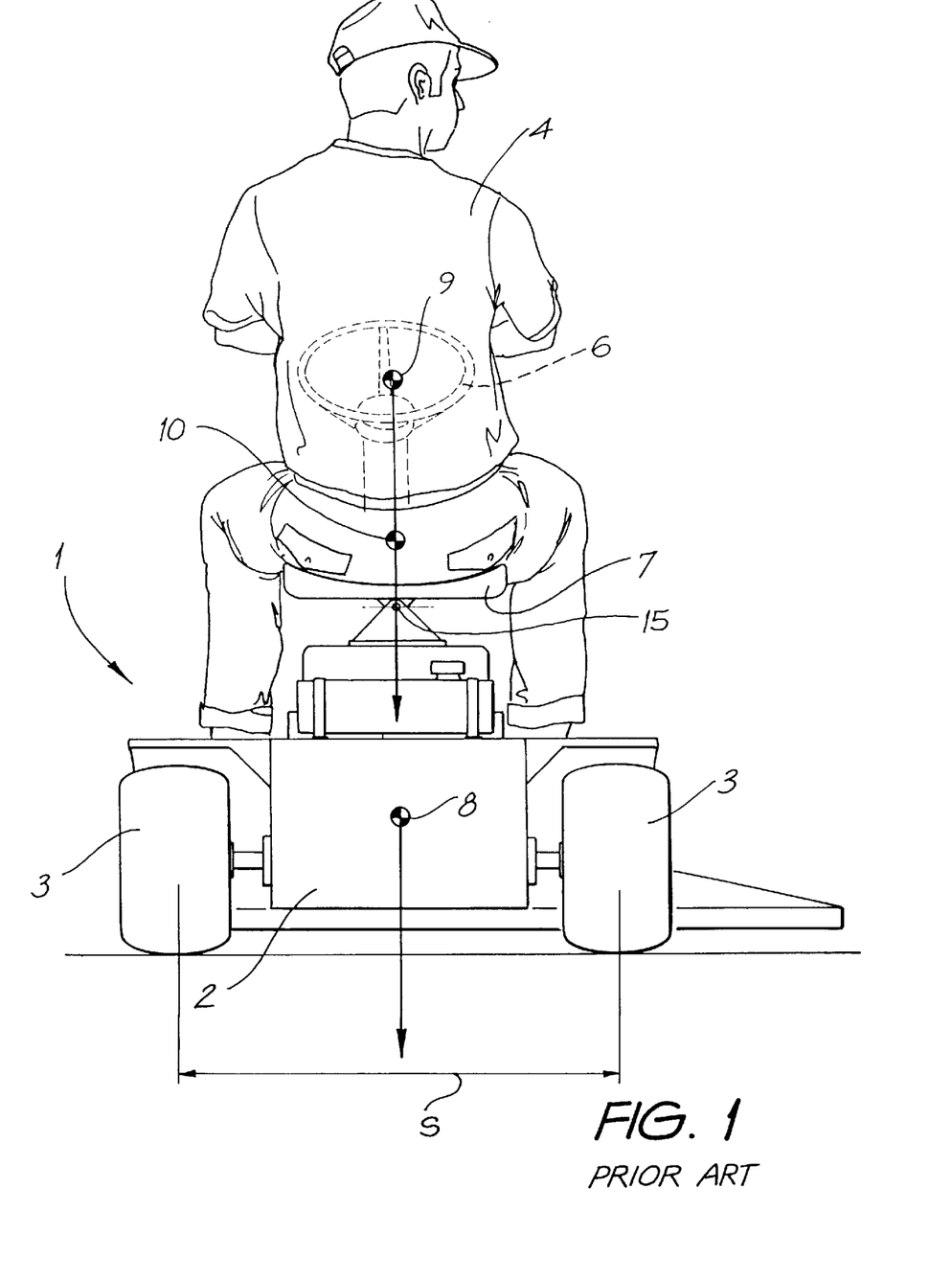
FIGS. 1 is a rear view of a conventional vehicle of the type described travelling along a horizontal non-sloping path.
Figure 2:
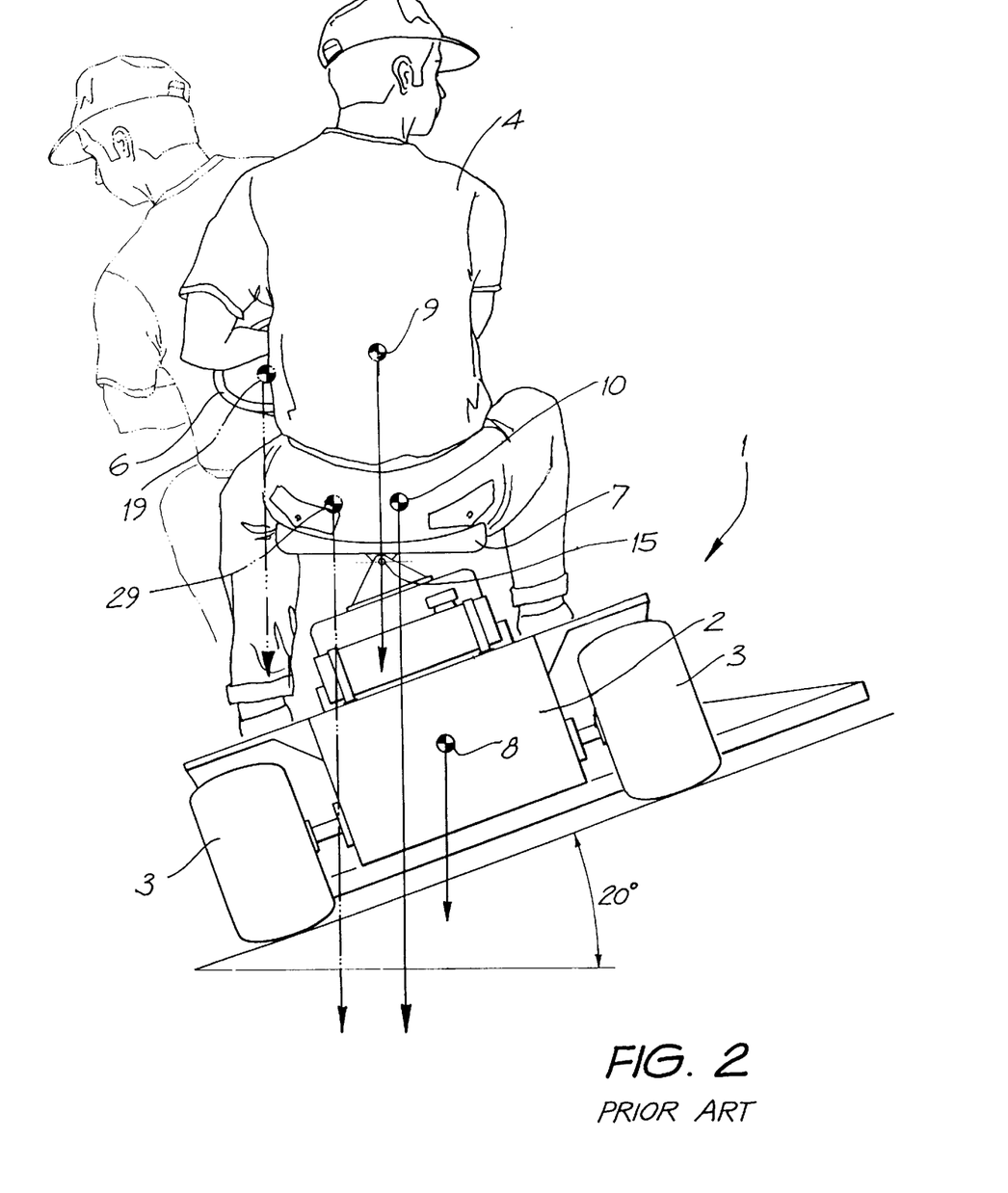
FIG. 2 shows what happens when the vehicle of FIG. 1 encounters a lateral slope of between 15° and 20°.

FIGS. 1 and 2 show a vehicle 1 of the type described and forming part of the prior art. It has a self-propelled body 2 having four low profile wheels 3 which are axially spaced from one another by a distance "s" which is normally less than a meter. A driver 4 manoeuvres the vehicle by means of a steering wheel 6 and sits on a seat 7 on top of the vehicle. The seat 7 shown in FIGS. 1 and 2 is able to tilt about a fixed axis 15 immediately beneath the seat pan to enhance the comfort of the driver when the vehicle is travelling along a laterally sloping verge. The seat 7 is incapable of any significant lateral displacement with respect to the pivot axis 15 which is positioned directly beneath the pan of the seat 7 to ensure that the centre of gravity of the driver is as low as possible, while still permitting the seat to tilt.

The separate centres-of-gravity of the vehicle and the driver are respectively indicated at 8 and 9, respectively, and the resultant centre-of-gravity of the combination of the two is shown at 10. The weight of the vehicle is commensurate with that of the driver and the arrowed line extending vertically downwards through the three centres-of-gravity 8,9,10 represent weight.

OPERATION OF PRIOR ART EMBODIMENT

When the vehicle is travelling along a flat level verge, the weight vectors of the driver and the vehicle extend vertically down in the mid vertical plane of the vehicle as shown in FIG. 1. The vehicle is then stable.

However, when the vehicle travels along a laterally sloping verge of 20° as shown in FIG. 2, it only require a small movement of the driver towards the downhill side of the vehicle, as shown in broken outline, caused for instance by him leaning suddenly to the left to observe something on the ground, to result in the vehicle approaching an unstable condition. This follows from the downhill shift in the driver's centre of gravity to the position 19 to produce a consequential shift in the resultant centre-of-gravity to the position 29. If the vehicle should then chance to run over a large stone or sudden dip in the ground on one side, the line-of-action of the resultant centre of gravity can easily pass beyond the spacing between the wheels and the vehicle will then become unstable and topple over.

DESCRIPTION OF FIRST EMBODIMENT

Figure 3:
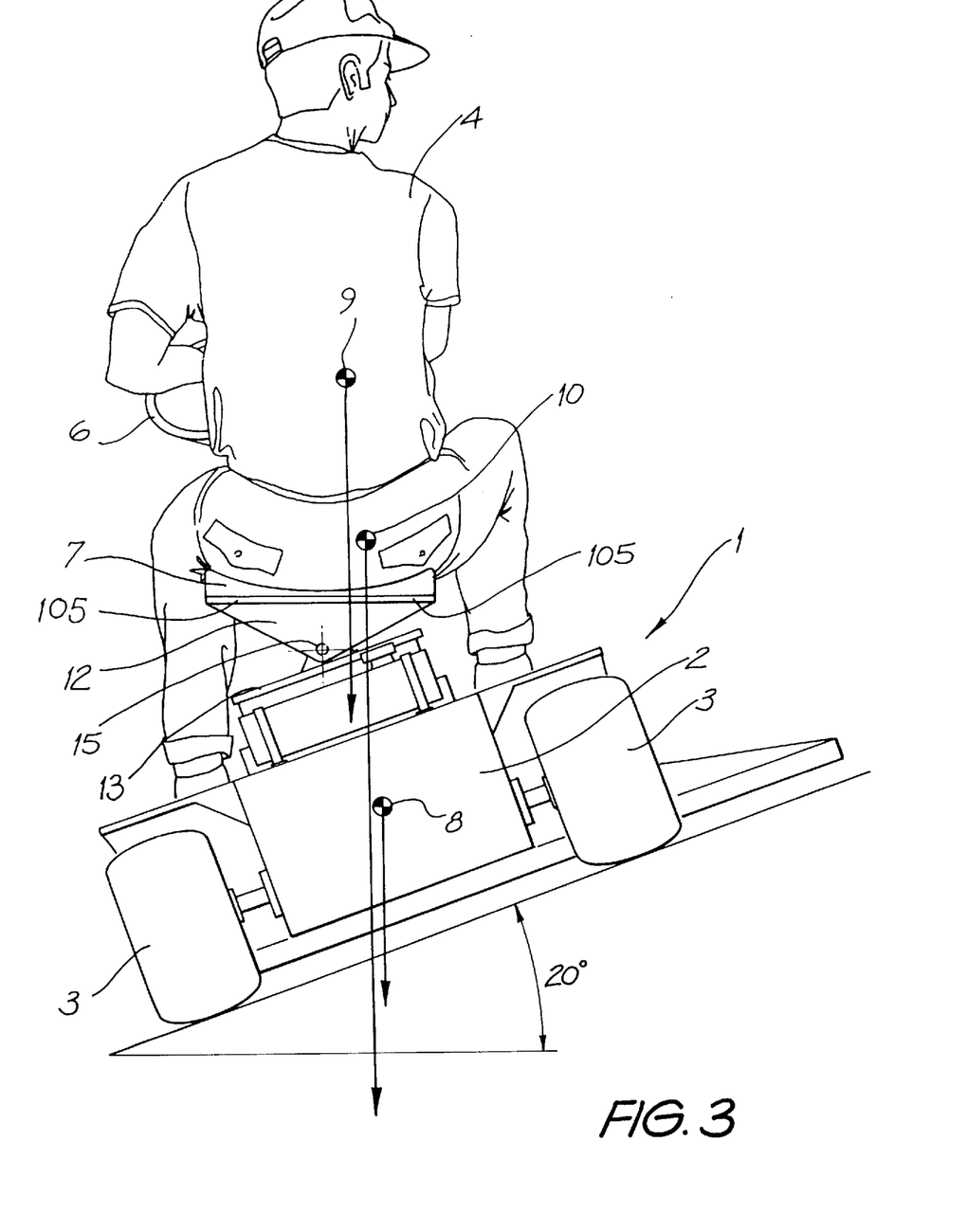
FIG. 3 corresponds to FIG. 2 but shows the effect of fitting to the vehicle a seat of the present invention.
Figure 4:
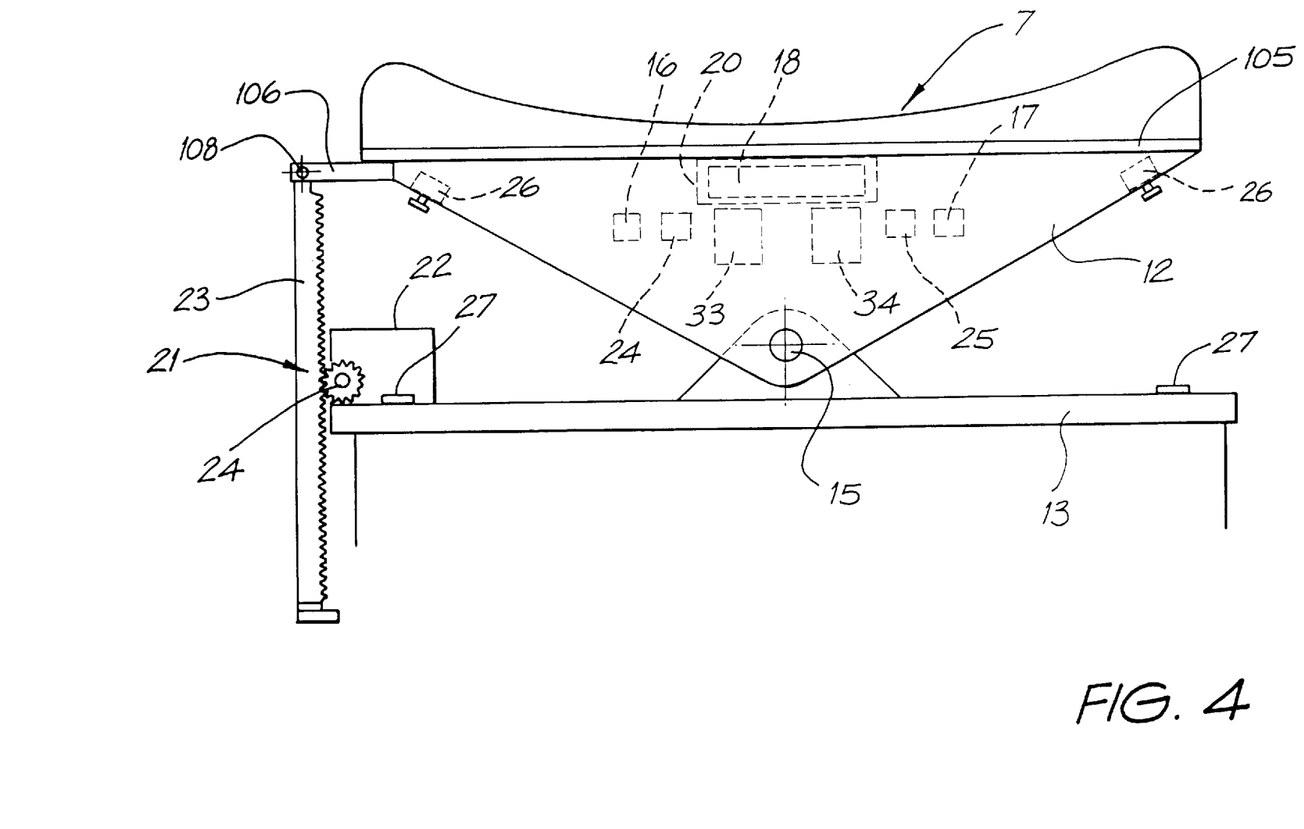
FIG. 4 is a rear view of the seat to show the location of various components used to control the seat's movement.

In FIGS. 3 and 4 component parts identical to those illustrated in FIGS. 1 and 2 have been given the same reference numerals to avoid needless repetition of description.

In FIGS. 3 and 4 the vehicle of the type described has it a seat support plate 105 onto which the vehicle's seat 7 is fitted. A member in the form of a triangular flange 12 is fixed to the underside of the plate 105 and is pivoted at its lower end at 15 to a base plate 13 attached to seat anchorages provided on the body of the vehicle. The component parts between the base plate 13 and the plate 105 are, in practice, made and sold as an assembly which can be bought by an owner of a vehicle of the type described, and attached to the seat position of the vehicle. The vertical length of the flange 12 is such that it can turn in the vertical plane about the axis 15 through an angle of about 20° in either direction to produce a significant displacement of the seat when tilted with respect to the vehicle. The axis 15 extends horizontally forwards in the direction of travel of the vehicle and is located midway between its side wheels 3. It will be noticed that the flange 12 provides a spacing between the seat support plate 105 and the axis 15 which is substantially greater than occurs in prior art arrangements which only allow the seat to tilt, but not to displace laterally to any significant extent. In practice, the spacing of the centre of the seat from the pivot axis 15 is normally chosen to lie somewhere between about six and about fifteen centimeters or more, depending on the type of vehicle and the performance it is required to achieve. By having the pivot axis 15 close to the upper surface of the base plate 13 and well beneath the seat support plate 105, the height of the seat 4 from the ground can be maintained much the same as occurs with a conventional vehicle of the type described.

As shown in FIG. 4, the flange 12 provides a mount for a pair of mercury switches 16,17 which are arranged to respond to tilt of the seat support plate 105 from the horizontal. The switch 16 responds to tilt in one direction, and the switch 17 responds to tilt in the opposite direction. An electronic tilt-control processor 18 (shown in FIG. 4) is mounted in a box 20 attached to the underside of the seat support plate 105. A mechanism 21 in the form of a rack 23 and pinion 24 is connected between a pivot pin 108 provided on a lug 106 extending laterally away from one side of the seat support plate 105, and the base plate 13. The mechanism 21 positively controls the tilt of the seat in accordance with an output signal from the processor 18 applied to a motor 22 driving the pinion 23 of the mechanism 21.

Each of the mercury switches 16,17 has an associated adjustable time-delay unit 24,24 also mounted under the seat mounting plate 105. The units 24,24 prevent any tilt signal being fed from the mercury switches to the processor, unless it is sustained for a period of about one second. This period is manually adjustable and ensures that spurious signals caused by mechanical vibration of the mercury switches, do not result in tilt-correction signals being fed to the mechanism 21.

A limit switch 26 is provided at each side of the flange 12 to prevent operation of the mechanism 21 if the seat 4 is already toits maximum tilt position. This occurs with movement of the seat support plate 105 through an angle of about 20° with respect to the base plate 13, and is sensed by the engagement of one or other of the limit switches 26 with respective abutments 27 provided at the sides of the base plate 13.

FIG. 4 shows an electrical block circuit diagram of the processor controlling tilt of the seat. The electrical output signals from the mercury switches 16,17 are respectively fed through two parallel branches 31,32 of the processor which also contain the limit switches 26 and the time-delay units 24,24. Signals transmitted through the time delay units are supplied to respective relays 33,34 which each have a contact in the other circuit branch to prevent simultaneous operation of the two branches. Thus the processor responds to the signal input from one branch at a time, and the polarity of this input determines the direction of tilt of the seat 4. Damping circuitry (not shown) is provided in the processor for preventing cyclically-recurring small vibrations, such as are produced by an engine on the vehicle, from causing the mechanism 21 to produce to small oscillatory vibrations of the seat.

OPERATION OF THE FIRST EMBODIMENT

When the vehicle is travelling along a level verge, neither of the mercury switches 16,17 is operated and the seat 107 is level.

If the vehicle encounters a sloping verge, as shown in FIG. 3, one or other of the mercury switches 16,17 is operated. If the signal from the switch is maintained for longer than a second, the associated time-delay unit 24,24 opens to allow the signal to be applied through the relay 33,34 to the tilt-control processor. This operates by sending a signal to the pinion-drive motor of the mechanism 21, so that the seat is tilted about the axis in the appropriate direction to maintain the seat pan level.

The vertical distance of the seat support plate 105 above the pivot axis 15, is such that, if the vehicle tilts down laterally to the left in the drawing, the seat is tilted down to the right and its centre simultaneously shifts to the right. This shift produces a displacement of the centre-of-gravity 9 of the driver in the uphill direction so that the displacement of the resultant centre-of-gravity 10 of the combination of the vehicle and driver also shifts uphill with respect to the position it occupies in the prior art arrangement shown in FIG. 2. The risk of the vehicle toppling as a result of a temporary sideways movement of the driver or an unexpected sideways rocking of the vehicle,is thus greatly reduced while the comfort of the driver is maintained.

MODIFICATION OF FIRST EMBODIMENT

Various modifications of the above described arrangement are possible. For example, instead of relying on the vertical spacing of the pivot axis beneath the seat to produce the desired lateral displacement of the seat pan as it tilts, separate devices may be used for tilting the seat and for simultaneously moving it laterally in the upward direction of the verge slope. One such arrangement which is not illustrated, uses a pivot axis to tilt the seat and a separate device for displacing the pivot axis laterally in the desired direction. The second device may comprise a hydraulic piston-and-cylinder unit or a rack-and-pinion unit.

Figure 5:
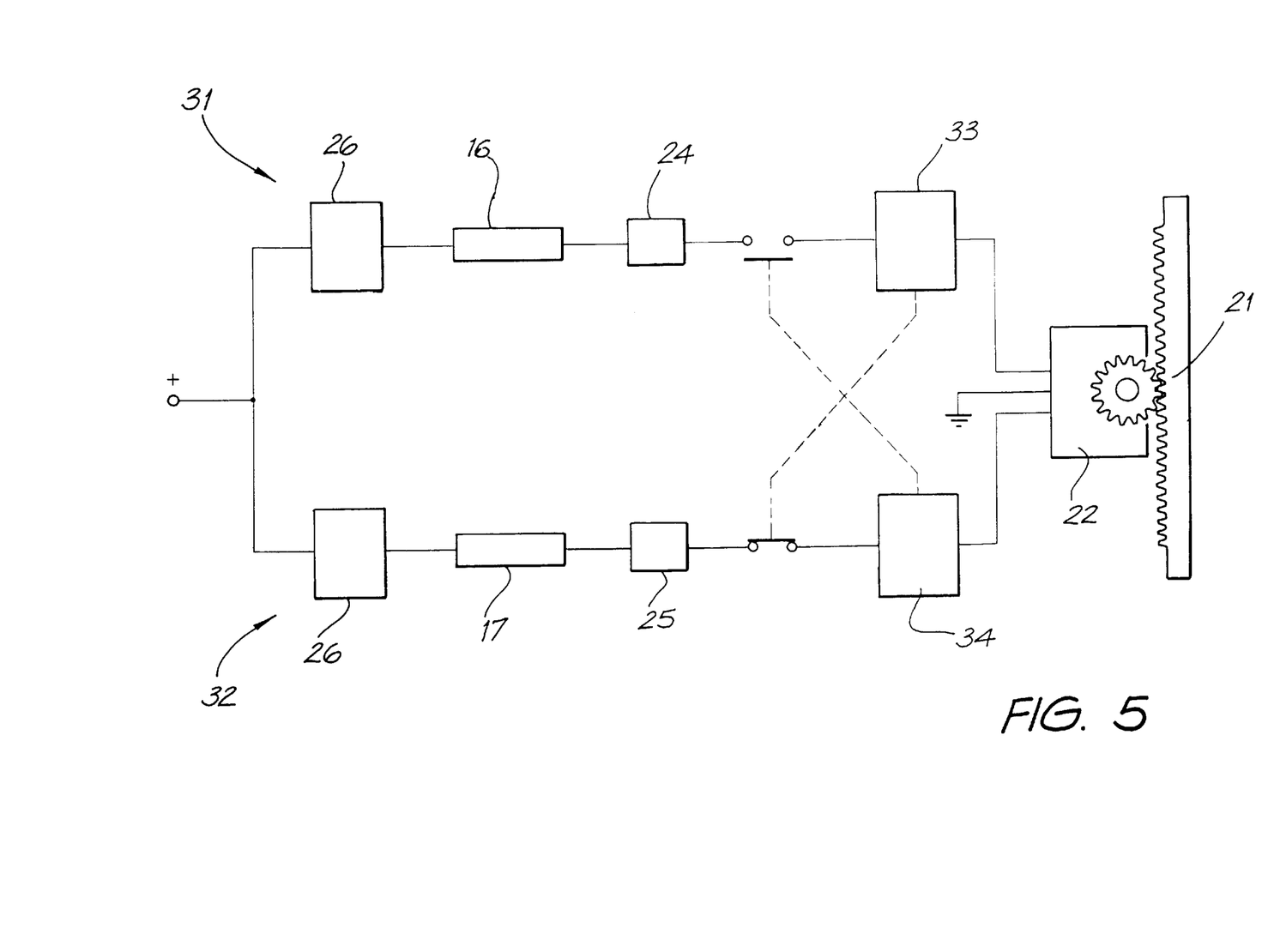
FIG. 5 is a block schematic electrical circuit diagram of an electronic processor mounted beneath the seat and used to control its tilting movement; and, FIG. 6 shows how pendulum-operated switches may be used in place of mercury switches to sense tilting of the seat with respect to the vehicle.
Figure 6:
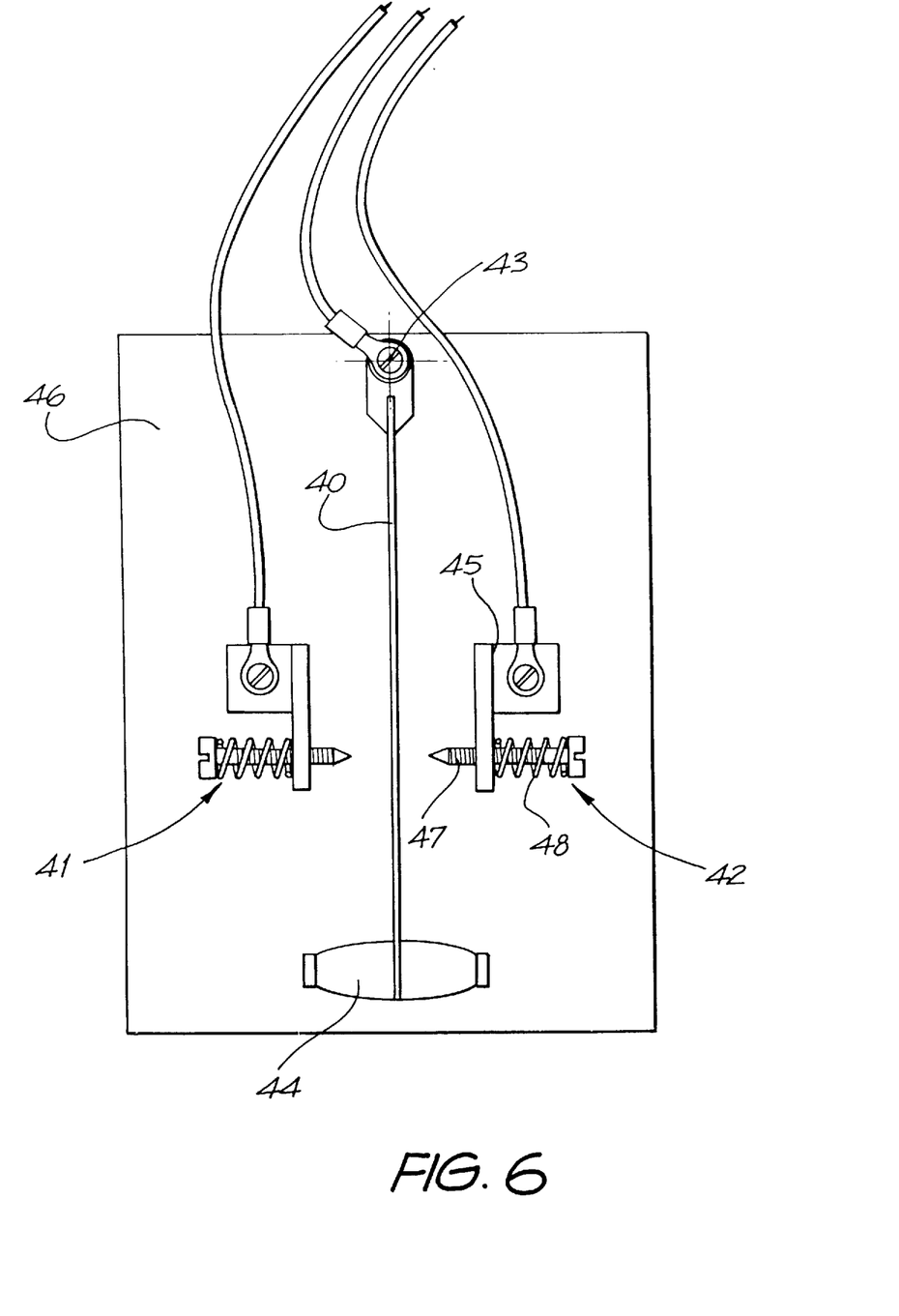

FIG. 6 shows a modification employing a copper strip pendulum 40 to complete an electrical circuit selectively to two electrical terminals 41,42 to take the place of the mercury operated switches of the earlier described embodiment. The pendulum is pivoted at its upper end at 43 to an insulated board 46 attached to the flange 12 of FIG. 4, and carries a weight 44 at its lower end. Each of the terminals 41,42 is formed by a conductive metal bracket 45 screwed to the board 46, and provided with a screw contact 47 biased by a coil compression spring 48. Adjustment of the contacts 47 enables the seat angle at which tilt-correction movement is to commence, to be altered. A tilt-correction signal is generated when the movement of the pendulum is such that it completes an electrical circuit to one or other of the contacts 47 which are respectively connected to the two branches of the electrical circuit shown in FIG. 5.

I claim:

1. An assembly for installation in a self-propelled vehicle having a seat anchorage and a seat pan removably attached to the seat anchorage, said assembly comprising:
    a base plate structure for attachment to the seat anchorage of the vehicle after removal of the seat pan from the seat anchorage,
    a seat support means for receiving the seat pan at an upper side of the seat support means after removal of the seat pan from the seat anchorage, the seat support means having a lower side opposite its upper side,
    an interconnect member fixed to the lower side of the seat support means and extending therefrom,
    a pivot connecting a lower end of said interconnect member to the base plate structure and allowing angular movement of the seat support means relative to the base plate structure,
    a mechanism effective between the base plate structure and the seat support means to change the angular position of the seat support means relative to the base plate structure about the pivot,
    a tilt sensor which automatically provides an output signal in response to tilting of the seat support means from a horizontal position, and
    processing circuitry responsive to said signal to operate said mechanism and restore the seat support means to a horizontal position,
    whereby the assembly can be installed in the vehicle as a self-contained unit, independent of other mechanisms of the vehicle, by removing the seat pan, attaching the base plate structure to the seat anchorage and attaching the seat pan to the seat support means.

2. An assembly according to claim 1, wherein the mechanism includes a rack member attached at one end to the seat support means, a pinion engaged with the rack member and mounted to the base plate structure, and an electric motor for driving the pinion.

3. An assembly according to claim 1, wherein the processing circuitry includes an electrical circuit having first and second parallel branches, the tilt sensor includes a switch means having first and second contacts associated with the first and second parallel branches respectively of the electrical processing circuit, for providing an output signal having a first component in response to tilting of the seat support means from a horizontal position in a first direction and a second component in response to tilting of the seat support means from a horizontal position in a second direction, opposite the first direction.

4. An assembly according to claim 3, wherein the switch means comprises first and second mercury tilt switches on said seat means and associated with said first and second parallel branches respectively of the electrical processing circuit.

5. An assembly according to claim 3, wherein the switch means includes a pendulum operated switch having first and second contacts associated with said first and second parallel branches respectively of the electrical processing circuit.

6. An assembly according to claim 3, wherein each branch includes an adjustable time delay unit allowing the respective signal component to pass through it if the signal component is sustained for longer than one second.

7. An assembly according to claim 3, including a first relay having a contact which operates to prevent the first branch from processing a signal component if the second branch is operating and a second relay having a contact which operates to prevent the second branch from processing a signal component if the first branch is operating.

8. An assembly according to claim 1, including limit switches between the base plate structure and the seat support means for preventing the processing circuitry from responding to said signal in the event that tilting of the seat support means relative to the base plate structure exceeds a predetermined angle.

9. An assembly according to claim 1, wherein the processing circuitry includes a vibration suppression circuit.

10. An assembly according to claim 1, wherein the mechanism includes an electric motor and the processing circuitry is an electrical circuit.

11. A self-propelled vehicle having a seat anchorage, a seat pan and a seat mounting assembly comprising:

a base plate structure removably attached to the seat anchorage of the vehicle, a seat support means which detachably receives the seat pan at an upper side of the seat support means, the seat support means having a lower side opposite its upper side, an interconnect member fixed to the lower side of the seat support means and extending therefrom, a pivot connecting a lower end of said interconnect member to the base plate structure and allowing angular movement of the seat support means relative to the base plate structure, a mechanism effective between the base plate structure and the seat support means to change the angular position of the seat support means relative to the base plate structure about the pivot, a tilt sensor which automatically provides an output signal in response to tilting of the seat support means from a horizontal position, and processing circuitry responsive to said signal to operate said mechanism and restore the seat support means to a horizontal position, and wherein the seat mounting assembly can be removed from the vehicle as a self-contained unit, independent of other mechanisms of the vehicle, and the seat pan can be detached from the seat support means and attached to the seat anchorage in place of the base plate structure.

12. A vehicle according to claim 11, wherein the mechanism includes a rack member attached at one end to the seat support means, a pinion engaged with the rack member and mounted to the base plate structure, and an electric motor for driving the pinion.

13. A vehicle according to claim 11, wherein the processing circuitry includes an electrical circuit having first and second parallel branches, the tilt sensor includes a switch means having first and second contacts associated with the first and second parallel branches respectively of the electrical processing circuit, for providing an output signal having a first component in response to tilting of the seat support means from a horizontal position in a first direction and a second component in response to tilting of the seat support means from a horizontal position in a second direction, opposite the first direction.

14. A vehicle according to claim 13, wherein the switch means comprises first and second mercury tilt switches on said seat means and associated with said first and second parallel branches respectively of the electrical processing circuit.

15. A vehicle according to claim 13, wherein the switch means includes a pendulum operated switch having first and second contacts associated with said first and second parallel branches respectively of the electrical processing circuit.

16. A vehicle according to claim 13, wherein each branch includes an adjustable time delay unit allowing the respective signal component to pass through it if the signal component is sustained for longer than one second.

17. A vehicle according to claim 13, including a first relay having a contact which operates to prevent the first branch from processing a signal component if the second branch is operating and a second relay having a contact which operates to prevent the second branch from processing a signal component if the first branch is operating.

18. A vehicle according to claim 11, including limit switches between the base plate structure and the seat support means for preventing the processing circuitry from responding to said signal in the event that tilting of the seat support means relative to the base plate structure exceeds a predetermined angle.

19. A vehicle according to claim 11, wherein the processing circuitry includes a vibration suppression circuit.

20. A vehicle according to claim 11, wherein the mechanism includes an electric motor and the processing circuitry is an electrical circuit.

* * * * *